(12) United States Patent
Thompson (10) Patent No.: US 11,096,025 B1
(45) Date of Patent: Aug. 17, 2021

(54) WIRELESS BLUETOOTH DEVICE PROXIMITY DETECTION SYSTEM AND PROCESS

(71) Applicant: Thomas David Monberg Thompson, Houston, TX (US)

(72) Inventor: Thomas David Monberg Thompson, Houston, TX (US)

( * ) Notice: Subject to any disclaimer, the term of this patent is extended or adjusted under 35 U.S.C. 154(b) by 0 days.

(21) Appl. No.: 16/863,827

(22) Filed: Apr. 30, 2020

(51) Int. Cl.
| | | |
|---|---|---|
| *H04W 4/00* | (2018.01) | |
| *H04W 4/38* | (2018.01) | |
| *H04B 17/318* | (2015.01) | |
| *H04W 4/029* | (2018.01) | |
| *H04W 4/80* | (2018.01) | |

(52) U.S. Cl.
CPC ............ *H04W 4/38* (2018.02); *H04B 17/318* (2015.01); *H04W 4/029* (2018.02); *H04W 4/80* (2018.02)

(58) Field of Classification Search
CPC ......... H04W 4/38; H04W 4/029; H04W 4/80; H04B 17/318
USPC .................................................. 370/329, 338
See application file for complete search history.

(56) References Cited

U.S. PATENT DOCUMENTS

| | | | |
|---|---|---|---|
| 6,448,906 B1 | 9/2002 | Nachtsheim et al. | |
| 7,260,835 B2 | 8/2007 | Bajikar | |
| 8,879,994 B2 * | 11/2014 | Brown | ............ G06K 19/06037 |
| | | | 455/41.3 |
| 9,185,735 B2 * | 11/2015 | Brown | ............ G06K 19/06112 |
| 9,467,802 B2 * | 10/2016 | Brown | ............ G06K 19/06037 |
| 10,623,934 B2 * | 4/2020 | Brown | .................. H04W 12/04 |
| 2004/0253923 A1 * | 12/2004 | Braley | ..................... H04L 61/00 |
| | | | 455/41.2 |
| 2005/0085188 A1 * | 4/2005 | Ishii | .................. H04M 1/72409 |
| | | | 455/41.2 |
| 2006/0116107 A1 * | 6/2006 | Hulvey | ............... H04M 1/6066 |
| | | | 455/411 |
| 2006/0135064 A1 * | 6/2006 | Cho | ....................... H04W 12/50 |
| | | | 455/41.1 |
| 2011/0169654 A1 * | 7/2011 | Ketari | ................ G08B 13/1427 |
| | | | 340/687 |
| 2014/0222855 A1 * | 8/2014 | Lucero | .................... G06F 16/27 |
| | | | 707/769 |
| 2014/0229859 A1 * | 8/2014 | Palin | ..................... G06F 3/0484 |
| | | | 715/753 |

(Continued)

*Primary Examiner* — Marceau Milord
(74) *Attorney, Agent, or Firm* — Plager Schack LLP; Mark H. Plager; Stephen Hallberg (57) ABSTRACT

A software-implemented wireless Bluetooth device proximity detection process and a wireless Bluetooth device proximity detection system are disclosed. The software-implemented wireless Bluetooth device proximity detection process and wireless Bluetooth device proximity detection system is able to be utilized by any system or mobile device that has Bluetooth technology to detect the presence of devices in an area. The software-implemented wireless Bluetooth device proximity detection process and wireless Bluetooth device proximity detection system is able to accurately determine how many individuals are in an area along with monitoring specific individuals. Unlike traditional motion sensor devices, the software-implemented wireless Bluetooth device proximity detection process and wireless Bluetooth device proximity detection system is less prone to jamming, spoofing, and outright failing to work.

4 Claims, 4 Drawing Sheets

(56) References Cited

U.S. PATENT DOCUMENTS

| | | | | |
|---|---|---|---|---|
| 2014/0293829 A1* | 10/2014 | Visuri | ............... | H04M 15/8351 |
| | | | | 370/254 |
| 2015/0029880 A1* | 1/2015 | Burns | ................ | G01S 11/16 |
| | | | | 370/252 |
| 2015/0099469 A1* | 4/2015 | Goldstein | ............... | H04L 67/24 |
| | | | | 455/41.2 |
| 2015/0147067 A1* | 5/2015 | Ryan | ................ | H04W 4/02 |
| | | | | 398/118 |
| 2015/0163748 A1* | 6/2015 | Hrabak | ............ | H04W 52/0245 |
| | | | | 455/41.2 |
| 2016/0006577 A1* | 1/2016 | Logan | ................ | G05B 15/02 |
| | | | | 700/276 |
| 2016/0205238 A1* | 7/2016 | Abramson | ........... | G08G 1/0137 |
| | | | | 455/456.4 |
| 2017/0004475 A1* | 1/2017 | White | ................ | G07G 1/009 |
| 2017/0048376 A1* | 2/2017 | Logan | ................ | G05B 15/02 |
| 2017/0076583 A1 | 3/2017 | Hua et al. | | |
| 2017/0078454 A1* | 3/2017 | Berookhim | ............ | H04L 69/02 |
| 2017/0223216 A1* | 8/2017 | Su | ................ | H04N 1/32096 |
| 2017/0245104 A1* | 8/2017 | Klimek | ................ | G01S 5/0226 |
| 2017/0359339 A1* | 12/2017 | Hevizi | ................ | H04L 67/10 |
| 2018/0211188 A1* | 7/2018 | Bergdale | ............ | H04W 12/06 |
| 2018/0293523 A1* | 10/2018 | Bergdale | ............ | G06Q 10/025 |
| 2021/0092611 A1* | 3/2021 | Pasricha | ................ | H04K 3/43 |

* cited by examiner

WIRELESS BLUETOOTH DEVICE PROXIMITY DETECTION SYSTEM AND PROCESS

BACKGROUND

Embodiments of the invention described in this specification relate generally to wireless detection systems, and more particularly, to a wireless Bluetooth device proximity detection system and process.

There are places that are never secure due to the limitations of motion detector technologies. This leaves places vulnerable to intruders or other nefarious activities. Also in some places it's hard to determine where a person was at what time along with getting a head count for a particular area.

Most motion detection devices are primitive and have various vulnerabilities to failure or false alarms being caused. They are also proprietary for a particular system.

Therefore, what is needed is a way of secure an area and detect devices in the area without the use of traditional motion sensor devices.

BRIEF DESCRIPTION

A novel software-implemented wireless Bluetooth device proximity detection process and a novel wireless Bluetooth device proximity detection system are disclosed. In some embodiments, the software-implemented wireless Bluetooth device proximity detection process and wireless Bluetooth device proximity detection system is able to be utilized by any system or mobile device that has Bluetooth technology to detect the presence of devices in an area. In some embodiments, the software-implemented wireless Bluetooth device proximity detection process and wireless Bluetooth device proximity detection system is able to accurately determine how many individuals are in an area along with monitoring specific individuals. Unlike traditional motion sensor devices, the software-implemented wireless Bluetooth device proximity detection process and wireless Bluetooth device proximity detection system is less prone to jamming, spoofing, and outright failing to work. In some embodiments, the software-implemented wireless Bluetooth device proximity detection process and wireless Bluetooth device proximity detection system is able to take a count of how many devices are present in the area and can alert the user of any encounters that the Bluetooth device may have. In some embodiments, the software-implemented wireless Bluetooth device proximity detection process and wireless Bluetooth device proximity detection system alerts the main user of any new devices which may have come into contact with the device or saved devices that it keeps track of at all times if they become active in the area or not.

In some embodiments, the software-implemented wireless Bluetooth device proximity detection process includes several steps comprising (i) checking if the Bluetooth radio is operating by determining if the Bluetooth radio is turned on (ii) prompting the user to turn the Bluetooth radio on when Bluetooth is not turned on, (iii) using the Bluetooth radio to scan for nearby Bluetooth-enabled devices, (iv) checking each of the detected nearby devices to determine if they are new devices (not previously discovered or detected) based on a list of known devices that are stored on a connected computer, (v) adding any new devices to the list of devices stored on the computer, (vi) displaying information about the detected devices, including both new devices and previously known devices which are nearby, (vii) displaying an alert to highlight information about each newly detected device, (viii) allowing the user to pin any of the detected devices, including newly detected and previously detected devices, in order to track the behavior of the pinned devices, (ix) scanning again for nearby devices, (x) determining whether any new devices (not previously detected and stored) have been detected and storing any such newly detected devices on the computer after the second scan, (xi) checking the activity of each pinned device for changes, (xii) determining whether any activity changes have been detected by any of the pinned devices, (xiii) alerting the user of the change in activity for each pinned device which is determined to have changed its activity, (xix) displaying information about the detected devices and any new devices (after the second scan), and (xx) repeatedly cycling back to rescan the area for nearby devices to detect new devices and changes in activity of any nearby devices.

In some embodiments, the step for adding any new devices to the list of devices stored on the computer includes steps for storing information about each new device. In some embodiments, the stored information for each newly detected device includes a name of the new device, a universal unique identifier (UUID) tag of the new device, a timestamp of a time at which the new device is first discovered or detected, and a received signal strength indicator (RSSI) that relates to activity of the new device in the nearby area. In some embodiments, a detected change in the RSSI for a particular stored device indicates a change in activity of the device and triggers an alert notification to be displayed on a screen/monitor of the user.

In some embodiments, the wireless Bluetooth device proximity detection system includes (i) a Bluetooth radio-enabled wireless signal scanning device that is placed at a first location and uses a Bluetooth radio to scan for any Bluetooth-enabled devices in an area nearby the first location, (ii) a computing device of a user at a second location that receives information about detected nearby devices from the Bluetooth radio-enabled wireless signal scanning device, and (iii) a computer that stores known devices and expected activity of pinned devices. In some embodiments of the wireless Bluetooth proximity detection system, the computing device of the user at the second location checks the computer to determine whether any of the detected nearby devices is a new device that is not a stored known device. In some embodiments of the wireless Bluetooth proximity detection system, the computing device of the user at the second location checks the pinned devices stored in the computer to determine whether any of the detected nearby devices is a pinned device. In some embodiments of the wireless Bluetooth proximity detection system, the computing device of the user at the second location checks the expected activity of the pinned device to determine if the activity has changed. In some embodiments of the wireless Bluetooth proximity detection system, the computer stores a name of each new device, a universal unique identifier (UUID) tag of the new device, a timestamp of a time at which the new device is first detected, and a received signal strength indicator (RSSI) that relates to activity of the new device in the nearby area. In some embodiments of the wireless Bluetooth proximity detection system, a change in the RSSI indicates a change in activity of a stored device. In some embodiments of the wireless Bluetooth proximity detection system, the computing device of the user visually outputs an alert of the change in activity when the RSSI indicates the change in activity.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel software-implemented wireless Bluetooth device proximity detection process and wireless Bluetooth device proximity detection system. In some embodiments, the software-implemented wireless Bluetooth device proximity detection process and wireless Bluetooth device proximity detection system is able to be utilized by any system or mobile device that has Bluetooth technology to detect the presence of devices in an area. In some embodiments, the software-implemented wireless Bluetooth device proximity detection process and wireless Bluetooth device proximity detection system is able to accurately determine how many individuals are in an area along with monitoring specific individuals. Unlike traditional motion sensor devices, the software-implemented wireless Bluetooth device proximity detection process and wireless Bluetooth device proximity detection system is less prone to jamming, spoofing, and outright failing to work.

As stated above, there are places that are never secure due to the limitations of motion detector technologies. This leaves places vulnerable to intruders or other nefarious activities. Also, it is difficult in some areas to determine where a person was and at what time they were present, and similarly hard to obtain a head count for a particular area. Most of the existing conventional motion detection devices are primitive and have various vulnerabilities to failure or false alarms being caused. They are also proprietary for a particular system. Embodiments of the software-implemented wireless Bluetooth device proximity detection process and wireless Bluetooth device proximity detection system described in this specification solve such problems by allowing any mobile device to detect individuals that may be in an area that have Bluetooth devices or to detect Bluetooth devices in general. In some embodiments, the software-implemented wireless Bluetooth device proximity detection process and wireless Bluetooth device proximity detection system is able to take a count of how many devices are present in the area and can alert the user of any encounters that the Bluetooth device may have. In some embodiments, the software-implemented wireless Bluetooth device proximity detection process and wireless Bluetooth device proximity detection system alerts the main user of any new devices which may have come into contact with the device or saved devices that it keeps track of at all times if they become active in the area or not.

Embodiments of the software-implemented wireless Bluetooth device proximity detection process and wireless Bluetooth device proximity detection system described in this specification differ from and improve upon currently existing options. In particular, some embodiments differ because the software allows any device to become a motion detector for an area of any kind. This creates limitless security surveillance for any individual who owns a cellphone or a desktop computer. Furthermore, the software-implemented wireless Bluetooth device proximity detection process and wireless Bluetooth device proximity detection system is able to determine when an employee or group member leaves a designated area (such as a work station, work area, group meeting area, etc.). In this way, a manager can determine whether an employee is taking unauthorized breaks or cheating on time cards when the employee may not be in an area in which can be performed or completed, etc. For example, if a lifeguard leaves the nearby area of his or her lifeguard station/post, it is likely that the lifeguard is not in a position to watch the water for dangers or swimmer problems. Additionally, the lifeguard's supervisor could immediately take corrective action by having another lifeguard take the post of the missing lifeguard, or have swimmers leave the water, etc. Whatever it takes to ensures safety in such a situation is possible by way of the software-implemented wireless Bluetooth device proximity detection process and wireless Bluetooth device proximity detection system. In addition to such critical safety measures, and worker/group member adherence to rules or availability, the software-implemented wireless Bluetooth device proximity detection process and wireless Bluetooth device proximity detection system improves upon existing motion detection technology by being a workable solution in areas where motion detection wanes or does not work at all. For instance, if an intruder can hide behind furniture or a bookshelf, it might be possible to spring upon the user and cause distress or physical harm (possible loss of property or money, as well). In contrast, the software-implemented wireless Bluetooth device proximity detection process and wireless Bluetooth device proximity detection system relies on Bluetooth wireless technology, which is not limited to line-of-sight motion detection, and does not even need motion of an intruder to occur since the software-implemented wireless Bluetooth device proximity detection process and wireless Bluetooth device proximity detection system is able to detect any Bluetooth-enabled mobile device (or other device) simply by scanning the nearby area for the Bluetooth beacon/signal.

In addition, embodiments of the software-implemented wireless Bluetooth device proximity detection process and wireless Bluetooth device proximity detection system described in this specification improve upon the currently existing options because other conventional motion detection devices are limited to range or field of vision and are typically prone to failure, jamming attacks, and spoofing. The existing conventional devices also cannot tell the individual how many intruders there were nor can it not monitor specific devices an individual may have. In contrast, embodiments of the software-implemented wireless Bluetooth device proximity detection process and wireless Bluetooth device proximity detection system are able to be utilized in any system or mobile device that has Bluetooth technology. In addition, the software-implemented wireless Bluetooth device proximity detection process and wireless Bluetooth device proximity detection system are less prone to the problems that traditional motion sensor devices have such as jamming, spoofing, or outright failure. Furthermore, some embodiments of the software-implemented wireless Bluetooth device proximity detection process and wireless Bluetooth device proximity detection system are able to accurately determine how many individuals are present/ entering/leaving an area along with monitoring specific individuals as well.

The software-implemented wireless Bluetooth device proximity detection process and wireless Bluetooth device proximity detection system of the present disclosure may be comprised of the following elements. This list of possible constituent elements is intended to be exemplary only and it is not intended that this list be used to limit the software-implemented wireless Bluetooth device proximity detection process and wireless Bluetooth device proximity detection system of the present application to just these elements. Persons having ordinary skill in the art relevant to the present disclosure may understand there to be equivalent elements that may be substituted within the present disclosure without changing the essential function or operation of the software-implemented wireless Bluetooth device proximity detection process and wireless Bluetooth device proximity detection system.

1. Bluetooth radio in mobile or desktop computers/devices
2. Mobile device or desktop computer
3. Monitor
4. Touch screen interface or keyboard/mouse The software-implemented wireless Bluetooth device proximity detection process and wireless Bluetooth device proximity detection system of the present disclosure generally works by checking (first) whether the Bluetooth radio is operating—is Bluetooth turned on or off? Next, the user is able to turn on the Bluetooth radio when it is not operating, or if it is on by default, then the process begins in which Bluetooth devices are detected within an area. In some embodiments, the software-implemented wireless Bluetooth device proximity detection process and wireless Bluetooth device proximity detection system searches for Universal Unique Identifier (UUID) tags from any kind of Bluetooth device that is turned on. The software-implemented wireless Bluetooth device proximity detection process and wireless Bluetooth device proximity detection system then stores the name of the device, the UUID tag of the device, the timestamp of when the device was first discovered, and a Received Signal Strength Indicator (RSSI), which is followed by performing a reverse geocoding lookup to determine the location of where it was detected. The software-implemented wireless Bluetooth device proximity detection process and wireless Bluetooth device proximity detection system then stores this information into the computer and checks over again to see if any new devices have become detected by checking the UUID of the device and alerts the user of such devices. If a detected device is not a new device, the software-implemented wireless Bluetooth device proximity detection process and wireless Bluetooth device proximity detection system simply updates the information of the devices that it currently has stored into the desktop/mobile computer device. The user can also "pin" a device to keep track of that particular device and if it is still active near the desktop/mobile device. As a logical cycle, the software-implemented wireless Bluetooth device proximity detection process and wireless Bluetooth device proximity detection system perform the following steps: first the device (2) detects if the Bluetooth radio (1) is enabled. If so, the radio (1) then starts to do a peripheral scan of the area and detects if any devices have come into contact with the device (2). The device (2) then stops the scan from the Bluetooth radio (1) and displays the information to the user. This logic cycle is then repeated over a while loop for as long as the application is opened.

In some embodiments, the software-implemented wireless Bluetooth device proximity detection process includes several steps comprising (i) checking if the Bluetooth radio is operating by determining if the Bluetooth radio is turned on (ii) prompting the user to turn the Bluetooth radio on when Bluetooth is not turned on, (iii) using the Bluetooth radio to scan for nearby Bluetooth-enabled devices, (iv) checking each of the detected nearby devices to determine if they are new devices (not previously discovered or detected) based on a list of known devices that are stored on a connected computer, (v) adding any new devices to the list of devices stored on the computer, (vi) displaying information about the detected devices, including both new devices and previously known devices which are nearby, (vii) displaying an alert to highlight information about each newly detected device, (viii) allowing the user to pin any of the detected devices, including newly detected and previously detected devices, in order to track the behavior of the pinned devices, (ix) scanning again for nearby devices, (x) determining whether any new devices (not previously detected and stored) have been detected and storing any such newly detected devices on the computer after the second scan, (xi) checking the activity of each pinned device for changes, (xii) determining whether any activity changes have been detected by any of the pinned devices, (xiii) alerting the user of the change in activity for each pinned device which is determined to have changed its activity, (xix) displaying information about the detected devices and any new devices (after the second scan), and (xx) repeatedly cycling back to rescan the area for nearby devices to detect new devices and changes in activity of any nearby devices.

In some embodiments, the step for adding any new devices to the list of devices stored on the computer includes steps for storing information about each new device. In some embodiments, the stored information for each newly detected device includes a name of the new device, a universal unique identifier (UUID) tag of the new device, a timestamp of a time at which the new device is first discovered or detected, and a received signal strength indicator (RSSI) that relates to activity of the new device in the nearby area. In some embodiments, a detected change in the RSSI for a particular stored device indicates a change in activity of the device and triggers an alert notification to be displayed on a screen/monitor of the user.

Figure 1:
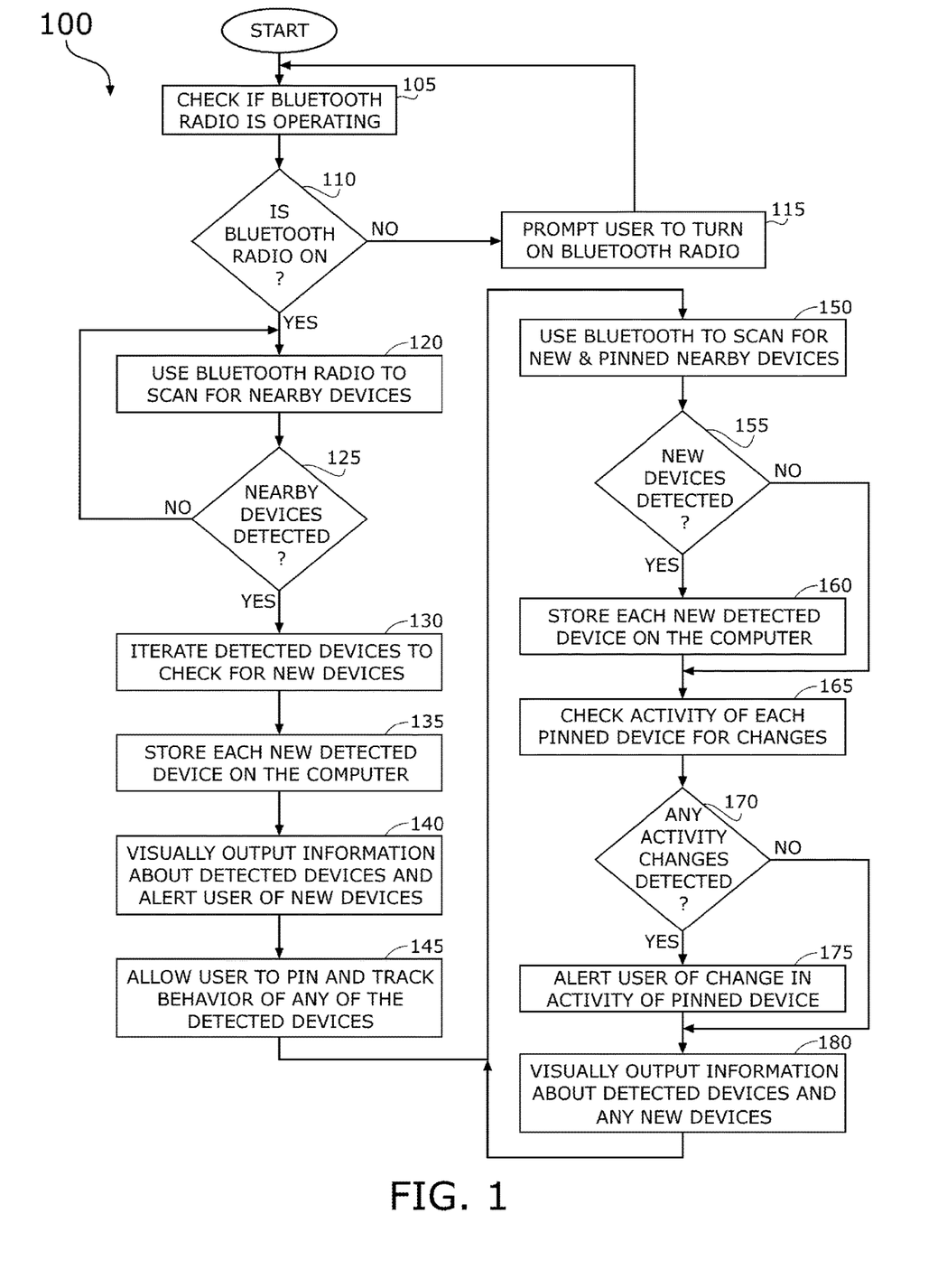
FIG. 1 conceptually illustrates a software-implemented wireless Bluetooth device proximity detection process in some embodiments.

By way of example, FIG. 1 conceptually illustrates a software-implemented wireless Bluetooth device proximity detection process 100. As shown in this figure, the software-implemented wireless Bluetooth device proximity detection process 100 starts by checking (at 105) if the Bluetooth radio is operating. The Bluetooth radio first needs to be turned on for the software-implemented wireless Bluetooth device proximity detection process 100 to continue. Thus, the software-implemented wireless Bluetooth device proximity detection process 100 determines (at 110) whether the Bluetooth radio is turned on. When the Bluetooth radio is not turned on, the software-implemented wireless Bluetooth device proximity detection process 100 prompts the user (at 115) to turn the Bluetooth radio on. Then the software-implemented wireless Bluetooth device proximity detection process 100 returns to the start to check (at 105) if the Bluetooth radio is operating.

On the other hand, when the Bluetooth radio is determined (at 110) to be turned on, then the software-implemented wireless Bluetooth device proximity detection process 100 uses the Bluetooth radio to scan (at 120) for nearby devices. Any nearby devices need to have Bluetooth technology and have it turned on to be detected. In some embodiments, when no nearby devices are detected, the software-implemented wireless Bluetooth device proximity detection process 100 returns to the prior step of using the Bluetooth radio to scan for nearby devices (at 120). In some embodiments, the software-implemented wireless Bluetooth device proximity detection process 100 continues this cycle for a time duration before ending.

However, when one or more nearby devices are determined (at 125) to be detected, then the software-implemented wireless Bluetooth device proximity detection process 100 iterates (at 130) through the detected nearby devices to check if any of the nearby devices are new devices. In some embodiments, a list of known devices are stored on the computer and any new devices that are detected are added to the list of devices. Thus, the software-implemented wireless Bluetooth device proximity detection process 100 stores (at 135) each new detected device on the computer. Next, the software-implemented wireless Bluetooth device proximity detection process 100 visually outputs (at 140) information about the detected devices and alerts the user of any new devices. In some embodiments, the software-implemented wireless Bluetooth device proximity detection process 100 allows the user to pin any of the detected devices (at 145) in order to track the behavior of the pinned devices.

Next, the software-implemented wireless Bluetooth device proximity detection process 100 of some embodiments uses the Bluetooth radio to again scan for nearby devices (at 150), including both new devices and pinned or previously detected/stored devices. The software-implemented wireless Bluetooth device proximity detection process 100 then determines (at 155) whether any new devices (not previously detected and stored) have been detected. When one or more new devices are detected, the software-implemented wireless Bluetooth device proximity detection process 100 stores (at 160) each new detected device on the computer and proceeds to the next step. On the other hand, when no new devices are detected, the software-implemented wireless Bluetooth device proximity detection process 100 simply proceeds to that next step, which is described next.

In some embodiments, the software-implemented wireless Bluetooth device proximity detection process 100 checks the activity of each pinned device for changes (at 165). Next, the software-implemented wireless Bluetooth device proximity detection process 100 determines (at 170) whether any activity changes have been detected by any of the pinned devices. When a change in activity of a pinned device is detected, the software-implemented wireless Bluetooth device proximity detection process 100 alerts the user (at 175) of the change in activity for the pinned device and continues to the next step of visually outputting (at 180) information about the detected devices and any new devices. On the other hand, when no change in activity is detected for any of the pinned devices, the software-implemented wireless Bluetooth device proximity detection process 100 skips the step for alerting the user of changes in activity and proceeds directly to the step for visually outputting (at 180) the information about the detected devices and any new devices. Then the software-implemented wireless Bluetooth device proximity detection process 100 cycles back to the step for using the Bluetooth radio to scan (at 150) for any new and/or pinned nearby devices, and proceeds accordingly. The software-implemented wireless Bluetooth device proximity detection process 100 only ends when the device is powered down or the Bluetooth radio are turned off.

In some embodiments, the wireless Bluetooth device proximity detection system includes (i) a Bluetooth radio-enabled wireless signal scanning device that is placed at a first location and uses a Bluetooth radio to scan for any Bluetooth-enabled devices in an area nearby the first location, (ii) a computing device of a user at a second location that receives information about detected nearby devices from the Bluetooth radio-enabled wireless signal scanning device, and (iii) a computer that stores known devices and expected activity of pinned devices. In some embodiments of the wireless Bluetooth proximity detection system, the computing device of the user at the second location checks the computer to determine whether any of the detected nearby devices is a new device that is not a stored known device. In some embodiments of the wireless Bluetooth proximity detection system, the computing device of the user at the second location checks the pinned devices stored in the computer to determine whether any of the detected nearby devices is a pinned device. In some embodiments of the wireless Bluetooth proximity detection system, the computing device of the user at the second location checks the expected activity of the pinned device to determine if the activity has changed. In some embodiments of the wireless Bluetooth proximity detection system, the computer stores a name of each new device, a universal unique identifier (UUID) tag of the new device, a timestamp of a time at which the new device is first detected, and a received signal strength indicator (RSSI) that relates to activity of the new device in the nearby area. In some embodiments of the wireless Bluetooth proximity detection system, a change in the RSSI indicates a change in activity of a stored device. In some embodiments of the wireless Bluetooth proximity detection system, the computing device of the user visually outputs an alert of the change in activity when the RSSI indicates the change in activity.

Figure 2:
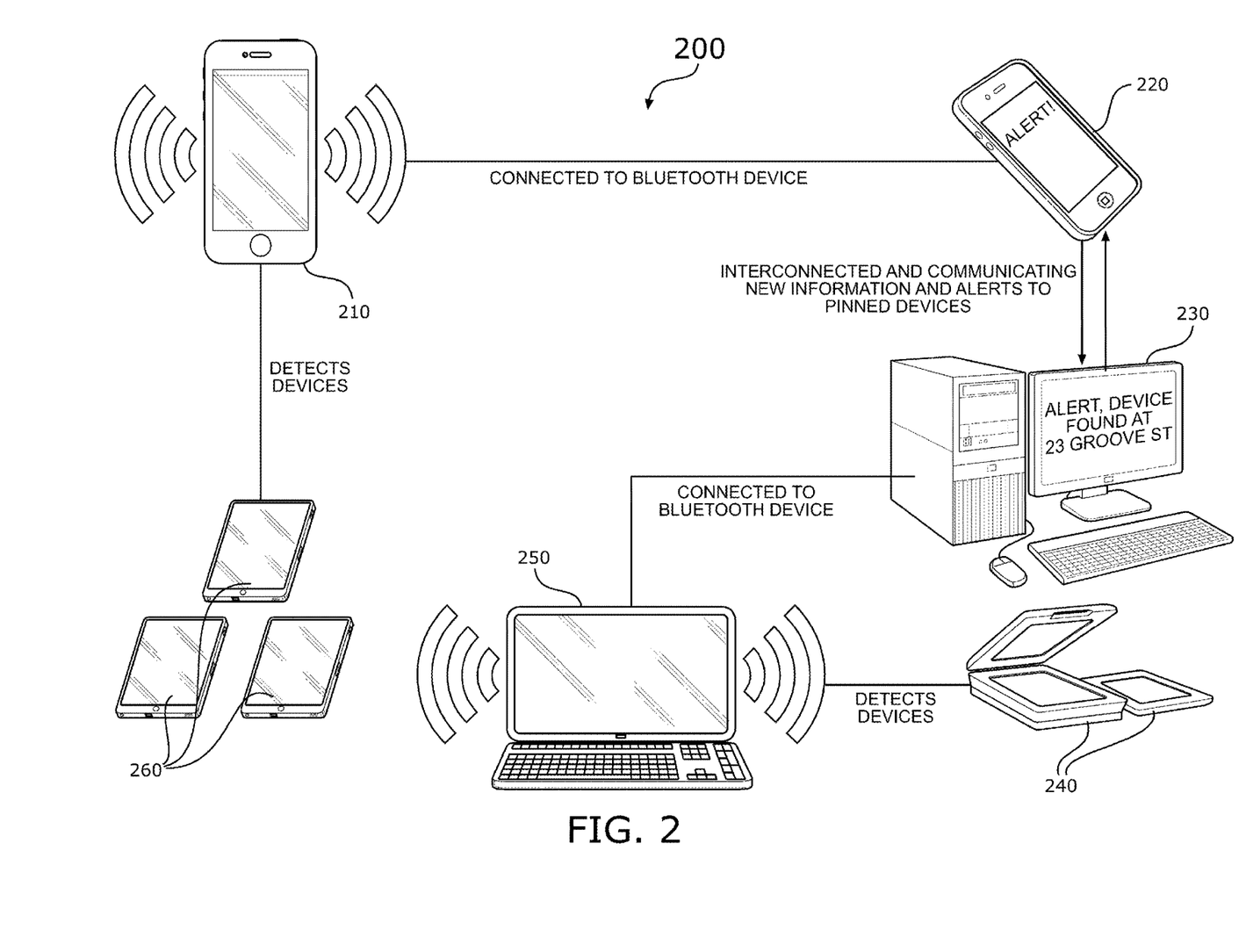
FIG. 2 conceptually illustrates a wireless Bluetooth device proximity detection system in some embodiments.

The software-implemented wireless Bluetooth device proximity detection process 100 described above by reference to FIG. 1 is visually demonstrated in FIG. 2, which conceptually illustrates a wireless Bluetooth device proximity detection system 200. As shown in this figure, the wireless Bluetooth device proximity detection system 200 includes a Bluetooth-enabled mobile device 210, a user mobile device 220, a desktop computer 230, a first plurality of nearby devices 240, a Bluetooth-enabled laptop computer 250, and a second plurality of nearby devices 260. Specifically, the second plurality of nearby devices 260 are located nearby the Bluetooth-enabled mobile device 210 which is able to detect the second plurality of nearby devices 260 because its Bluetooth radio is operating and it has scanned for nearby devices. The Bluetooth-enabled mobile device 210 would send information for the second plurality of nearby devices 260 to the user mobile device 220. Then the user mobile device 220 would connect to the desktop computer 230 to check the list of stored devices and check if any of the devices in the second plurality of nearby devices are pinned (and therefore, being tracked). If any of the devices in the second plurality of nearby devices 260 are new devices, then the user mobile device 220 would find out by checking the list of stored devices on the desktop computer 230. Any such new devices in the second plurality of nearby devices 260 would then be stored on the desktop computer 230 (and possibly pinned by the user to track). Also, the user mobile device 220 would visually output an alert if any of the devices in the second plurality of nearby devices 260 are pinned and have now engaged in some different or new action. For example, one of the devices in the second plurality of nearby devices may be in a location that is not permitted at this time or by a person associated with the device. This would then provide an alert to the proper authorized user to take appropriate action to correct the situation. Alternatively, if a previously stored device is detected in the second plurality of nearby devices 260, then if it was pinned, the user could be warned on the user mobile device 220. For example, if one of the devices was first detected as a new device and stored on the desktop computer 230, it is possible that an intruder quickly left the scene before other action could be taken by the user of the user mobile device 220, but later, if it was pinned for future behavior tracking, the user could immediately call authorities if the device appears at the location of the second plurality of nearby devices 260 in the future. In this way, the user can stay safe and alert of who/which devices are nearby.

Similarly, the Bluetooth-enabled laptop computer 250 may scan and detect the first plurality of nearby devices 240, and by connection to the desktop computer 230 check if any of the detected devices in the first plurality of nearby devices 240 is a new device (and therefore, should be stored) or a pinned device (which should be monitored or tracked for behavior, such as described above). Also, if either of the user mobile device 220 or the desktop computer 230 includes WiFi or other long-range communication modules, then it is possible to alert the user of the user mobile device 220 no matter if the user is remote or local to the nearby devices (for either or both of the first plurality of nearby devices 240 and the second plurality of nearby devices 260) In this way, it is possible to have complete proximity detection of devices in a defined area with informational notifications and alerts to one or more users as needed (whether local or remote).

To make the software-implemented wireless Bluetooth device proximity detection process and wireless Bluetooth device proximity detection system of the present disclosure, an individual would use a Bluetooth radio device, connect it to a desktop/mobile device and create software that could interface with the Bluetooth radio to detect other devices that are nearby. The individual could add more radios or stronger radios to increase the range of detection.

Figure 3:
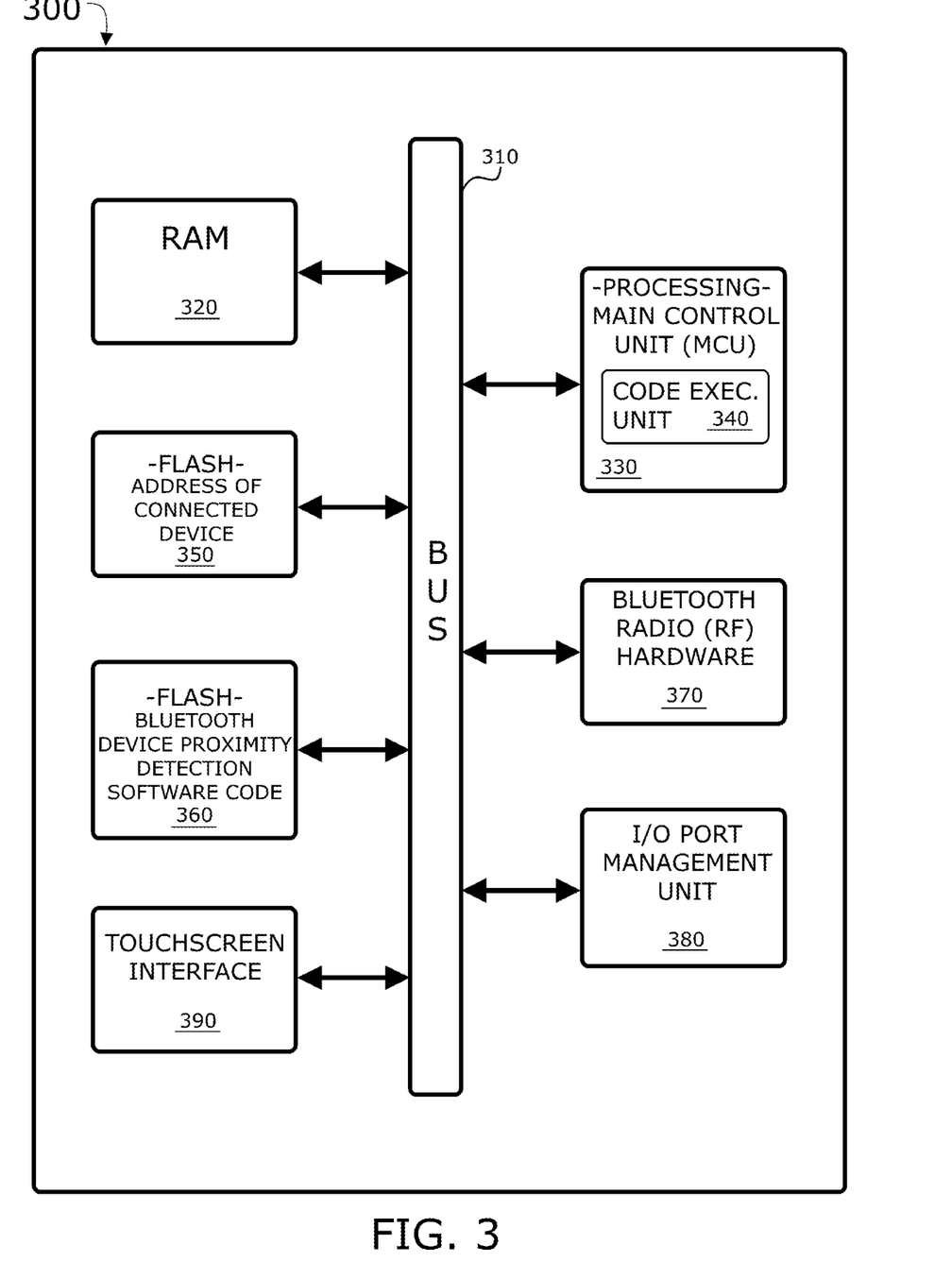
FIG. 3 conceptually illustrates a block diagram of a Bluetooth radio device in some embodiments.

By way of example, FIG. 3 conceptually illustrates a block diagram of a Bluetooth radio device 300 in some embodiments. As shown in this figure, the Bluetooth radio device 300 includes a printed circuit board (PCB) with a bus 310, a random access memory (RAM) 320, a main control unit (MCU) 330 for runtime processing of the Bluetooth radio device 300, a code execution unit 340 embedded within the MCU 330, a first persistent flash memory 350 that stores the address of a connected device (such as the user mobile device 220 and/or the desktop computer 230, described above by reference to FIG. 2), a second persistent flash memory 360 that stores software code for the software-implemented Bluetooth device proximity detection process, which is executed at runtime by the code execution unit 340 of the MCU 330 to detect nearby devices, including new devices and pinned devices, and provide the information and alerts to the computing device addressed by the address stored in the first persistent flash memory 350, a Bluetooth radio (RF) hardware module 370 to transmit and receive wireless Bluetooth radio signals, an input/output (I/O) management unit 380, and a touchscreen interface 390 to visually output instructions to turn Bluetooth on and receive a user's touch gesture to turn the Bluetooth radio on, in response.

To use the software-implemented wireless Bluetooth device proximity detection process and wireless Bluetooth device proximity detection system of the present disclosure, the user would be able to detect intruders or simply watch over particular individual devices that the user may have on them or that are within the vicinity of an area. They can also detect new devices that have entered the area and keep track of those devices. They can get a head count of how many individuals are within an area.

Additionally, the software-implemented wireless Bluetooth device proximity detection process and wireless Bluetooth device proximity detection system of the present disclosure can be used in graph network detection where the individual could have an entire network of devices that are detecting large swaths of areas from multiple locations and be alerted of every device that enters those areas as well as keep track of individual devices that enter the area. Also, the software-implemented wireless Bluetooth device proximity detection process and wireless Bluetooth device proximity detection system of the present disclosure can be adapted for use as stand alone Bluetooth radio detection and alert devices that do not require a desktop computer nor mobile device that can link up with those devices as well.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
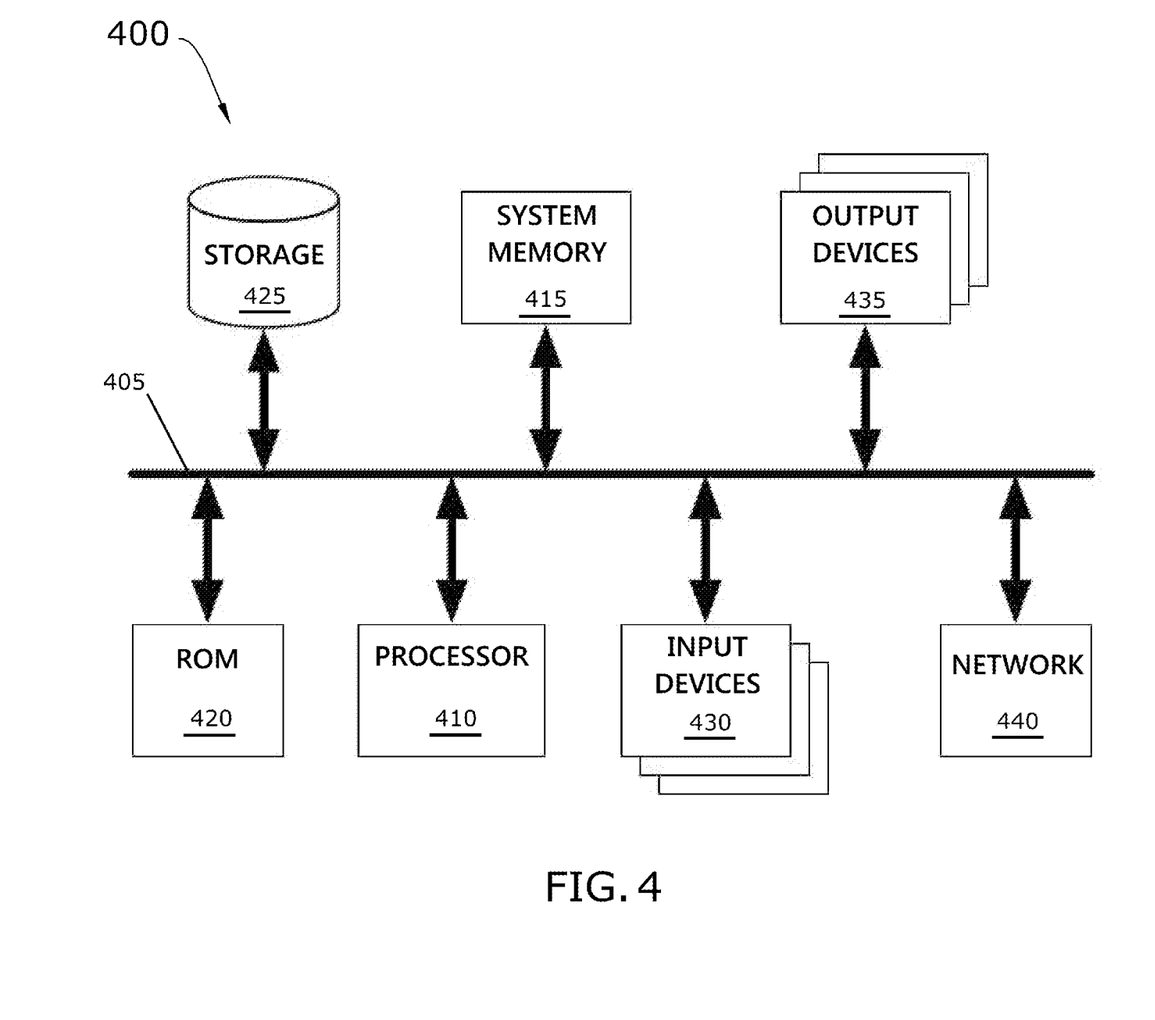
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, phone, PDA, in-car computer, tablet computing device, smartphone mobile device, or any other sort of electronic device. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT) or liquid crystal displays (LCD). Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates a process. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which, when executed by a processor of a computing device, performs wireless Bluetooth proximity detection of other devices, said program comprising sets of instructions for:
    checking if the Bluetooth radio is operating by determining if the Bluetooth radio is turned on;
    prompting the user to turn the Bluetooth radio on when Bluetooth is not turned on;
    using the Bluetooth radio to scan for nearby Bluetooth-enabled devices;
    checking each of the detected nearby devices to determine whether each device is new;
    adding any new devices to the list of devices stored on the computer;
    displaying information about the detected devices;
    displaying an alert to highlight information about each newly detected device;
    allowing the user to pin any of the detected devices in order to track behavior of the pinned devices;
    performing a second scan for nearby devices;
    storing any newly detected devices on the computer after the second scan;
    checking activity of each pinned device for changes;
    alerting the user of a change in activity for each pinned device with a change in activity;
    displaying information about the detected devices and any new devices after the second scan; and
    repeatedly re-scanning for new devices in the nearby area and changes in activity of any device.

2. The non-transitory computer readable medium of claim 1, wherein the set of instructions for checking each of the detected nearby devices to determine whether each device is new comprises checking a list of known devices that are stored on a connected computer.

3. The non-transitory computer readable medium of claim 1, wherein the set of instructions for storing comprises a set of instructions for storing unique device information about each new device, wherein the unique device information comprises a name of the new device, a universal unique identifier (UUID) tag of the new device, a timestamp of a time at which the new device is first discovered or detected, and a received signal strength indicator (RSSI) that relates to activity of the new device in the nearby area.

4. The non-transitory computer readable medium of claim 1, wherein the set of instructions for checking activity of each pinned device for changes comprises a set of instructions for detecting a change in the RSSI for a particular stored device and triggering an alert notification indicating the change in activity of the particular stored device.

* * * * *